US012381503B2

(12) United States Patent
Orbay et al.

(10) Patent No.: US 12,381,503 B2
(45) Date of Patent: Aug. 5, 2025

(54) METHOD FOR ADJUSTING AN OPERATIONAL PERFORMANCE OF AN ELECTRIC MACHINE, DATA PROCESSING DEVICE, COMPUTER PROGRAM, COMPUTER-READABLE STORAGE MEDIUM, AND ELECTRIC DRIVE SYSTEM

(71) Applicant: Volvo Car Corporation, Gothenburg (SE)

(72) Inventors: Raik Orbay, Gothenburg (SE); Andreas Ropel, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 152 days.

(21) Appl. No.: 18/330,646

(22) Filed: Jun. 7, 2023

(65) Prior Publication Data

US 2023/0402950 A1 Dec. 14, 2023

(30) Foreign Application Priority Data

Jun. 10, 2022 (EP) .................................... 22178497

(51) Int. Cl.
*H02P 1/38* (2006.01)
*H02P 25/20* (2006.01)
*H02P 25/24* (2006.01)

(52) U.S. Cl.
CPC .............. *H02P 25/20* (2013.01); *H02P 25/24* (2013.01)

(58) Field of Classification Search
CPC .. H02P 25/22; H02P 6/08; H02P 25/18; H02P 27/06; H02P 6/20; H02P 6/28
See application file for complete search history.

(56) References Cited

U.S. PATENT DOCUMENTS

| | | |
|---|---|---|
| 2013/0127391 A1 | 5/2013 | Lewis |
| 2020/0136546 A1 | 4/2020 | Chen |
| 2023/0283154 A1* | 9/2023 | Zhu ....................... H02P 25/107 318/496 |

FOREIGN PATENT DOCUMENTS

WO 2022060885 A1 3/2022

OTHER PUBLICATIONS

Extended European Search Report received for European Patent Application No. 22178497.8 dated Dec. 5, 2022, 8 pages.

* cited by examiner

*Primary Examiner* — Karen Masih
(74) *Attorney, Agent, or Firm* — Amin, Turocy & Watson, LLP

(57) ABSTRACT

Adjustment of operational performance of an electric machine (e.g., using a computerized tool) is enabled. For example, a non-transitory computer-readable medium can comprise executable instructions that, when executed by a processor, facilitate performance of operations, comprising: deactivating a first sub-set of winding sectors, wherein the first sub-set of the winding sectors comprises at least one winding sector, and triggering an AC drive signal for a second sub-set of the winding sectors such that a rotor is rotated using the winding sectors of the second sub-set, wherein an electric machine comprises a stator and the rotor, wherein the stator comprises a set of N phase windings, wherein each N phase winding, of the set of N phase windings, forms p poles around a circumference of the stator, and wherein each p pole, of the p poles, is formed by the at least one winding sector.

20 Claims, 5 Drawing Sheets

METHOD FOR ADJUSTING AN OPERATIONAL PERFORMANCE OF AN ELECTRIC MACHINE, DATA PROCESSING DEVICE, COMPUTER PROGRAM, COMPUTER-READABLE STORAGE MEDIUM, AND ELECTRIC DRIVE SYSTEM

CROSS-REFERENCE TO RELATED APPLICATIONS

This application claims the benefit of and priority to pending EP patent application serial number 22178497.8, filed Jun. 10, 2022, and entitled "METHOD FOR ADJUSTING AN OPERATIONAL PERFORMANCE OF AN ELECTRIC MACHINE, DATA PROCESSING DEVICE, COMPUTER PROGRAM, COMPUTER-READABLE STORAGE MEDIUM, AND ELECTRIC DRIVE SYSTEM," the entirety of which is hereby incorporated by reference herein.

TECHNICAL FIELD

The present disclosure relates to electric vehicles and, more particularly, to adjustment of operational performance of an electric machine.

BACKGROUND

In the field of electric drive systems, especially electric drive systems for vehicles, electric machines of different operational performance are provided. The operational performance may relate to a maximum torque of the electric machine. Electric machines of rather low operational performance, e.g., low maximum torque, may for example be used for small city vehicles, whereas electric machines of rather high operational performance, e.g., high maximum torque, may be used for luxury cars or sports cars. More generally speaking, electric machines of a certain bandwidth of operational performances are provided in order to be able to produce a certain product range of vehicles having an electric drive system. The larger the bandwidth of the operational performances and/or the product range, the higher is the complexity in the manufacturing of electric machines covering this bandwidth.

SUMMARY

It is an objective of the present disclosure to reduce the complexity being associated with the production of electric machines covering a bandwidth of operational performances. In other words, the production of electric machines covering a large bandwidth of operational performances shall be made possible in a low complexity manufacturing system.

The problem is at least partially solved or alleviated by the subject matter of the independent claims of the present disclosure, wherein further examples are incorporated in the dependent claims.

According to a first example, there is provided a method for adjusting an operational performance of an electric machine. The electric machine comprises a stator and a rotor. The stator comprises a set of N phase windings, wherein each of the N phase windings forms p poles around the circumference of the stator. Each pole is formed by at least one winding sector. The method comprises:

deactivating a first sub-set of winding sectors, wherein the first sub-set of winding sectors comprises at least one winding sector, and triggering an AC drive signal for a second sub-set of winding sectors such that the rotor is rotated using the winding sectors of the second sub-set.

The first sub-set of winding sectors and the second sub-set of winding sectors are overlap-free. Moreover, the first sub-set of winding sectors and the second sub-set of winding sectors together comprise all the winding sectors of the stator. Thus, only the winding sectors of the second sub-set are used for generating a torque at an output shaft of the rotor. This means that an operational performance of the electric machine can be adjusted by choosing the number and position of the winding sectors forming part of the first sub-set of winding sectors. This may also be called tailoring the operational performance of the electric machine. Consequently, the same rotor and the same stator may be used for providing electric machines of different operational performance. This facilitates the manufacturing as well as the scaling of the mechanical and electrical components of the electric machine. In an example, only one variant of the stator and one variant of the rotor need to be produced. In another example, one variant of a stator can be used in combination with different rotors each rotor being configured for an operational performance or a certain range of operational performances. The desired operational performance is set by associating the winding sectors to the first sub-set or the second sub-set. This may be done by a control unit being configured for controlling the operation of the electric machine. This substantially reduces the complexity in the production of electric machines without having a negative effect on the bandwidth of operational performances that can be provided.

The operational performance may relate to a maximum torque of the electric machine. Alternatively, or additionally, the operational performance may relate to a maximum driving range and/or to an emission indicator, e.g., $CO_2$ equivalent.

In the present context, triggering AC drive signals comprises adapting switching frequencies and switching times of an inverter unit and performing an inverter space vector modulation. To this end, a corresponding control software of the inverter unit may comprise torque-rotational speed-efficiency contours, e.g., in the form of lookup tables. Using these lookup tables, a working regime of the electric motor may be chosen by controlling an operational position on the torque-rotational speed-efficiency contour.

It is noted that it is also possible to trigger an AC drive signal for all winding sectors such that the rotor is rotated using all the winding sectors. In this case, the first sub-set comprises zero winding sectors.

In an example, each winding sector comprises a concentrated winding.

The general idea underlying the present disclosure is to produce one type of a stator and one type of a rotor. A performance level of the electric machine comprising this stator and this rotor can be set by associating the winding sectors to the respective first sub-set or the respective second sub-set in an appropriate manner. This may be done by a corresponding control software.

This has the effect that the same mechanical and electrical components of an electric motor can be used in vehicles of different performance categories, e.g., small city vehicles, luxury vehicles or sports vehicles. The necessary operational performance of the motor is realized and activated by the software.

Moreover, following the general idea underlying the present disclosure, different performance levels may be used for the same vehicle over its useful lifetime. For example, an increased performance may be used when travelling a long distance on a highway. The increased performance may be provided for some hours or for a day. The increased performance may be provided at the request of the user of the vehicle. In other words, the increased performance is provided on demand. It is also possible to provide an increased performance just for some minutes or less than an hour. This may be useful in a case in which a vehicle is towing a caravan and needs to go uphill. In such a situation, the increased performance may be provided instantaneously after having been requested. The increased performance may only be available at a certain fee which may depend from the magnitude, amount, or grade by which the performance is increased and/or the time span over which the increased performance is provided.

In this context, the performance of the electric motor, be it standard, low, high or anything in between, may be offered as a payable service. This means that not only a user of a vehicle can increase the performance and pay higher costs, but also the user can reduce costs by voluntarily reducing the available performance. A performance level may be offered to a user of the vehicle as a subscription, e.g., weekly, monthly, or yearly, or as a one time purchase.

The different levels of performance which may be set by associating the winding sectors to the first sub-set or the second sub-set respectively may also be connected to different available driving ranges as an efficiency-power-trade-off may be controlled by means of a motor topology, e.g., by choosing the number and position of the winding sectors forming part of the first sub-set of winding sectors and the second sub-set of winding sectors. Thus, the effects mentioned in connection with the performance also apply in connection with the driving range. This means that a certain driving range may be requested by a user and a corresponding performance level of the electric machine is set such that the desired driving range may be reached. The driving range may be set as an absolute distance or in the form of a target, e.g., a specific address in a city, which needs to be reached without recharging the vehicle.

The different levels of performance which may be set by associating the winding sectors to the first sub-set or the second sub-set respectively may also be set as a function of market restrictions or emission restrictions. The market restrictions or emission restrictions may apply in one or more geographic areas only, e.g., in cities. When entering such a geographic area, the winding sectors may be associated to the first sub-set or the second sub-set respectively such that market restrictions, for example relating to operational performance, and/or emission restrictions are met.

The winding sectors may be associated to the first sub-set or the second sub-set respectively such that a pre-defined level of emissions, e.g., calculated in kg of $CO_2$ or kg of $CO_2$ equivalent, is not exceeded. Thus, it can be guaranteed to the user or any other organization, that a certain budget of emissions is respected. If this budget is lower than a personal emission budget which is attributed to the user, the user may use the remaining portions of his or her personal budget in other ways. The user may for example trade or sell the remaining portions of his or her personal budget.

It is also possible that the levels of performance is adjusted by a user such that the corresponding vehicle fulfils the requirements for being attributed to a certain taxation class or taxation regime.

Moreover, all the settings of performance, emissions and driving range can be provided to a user during a trial period. Consequently, a user can try the desired setting before paying the corresponding fees.

A further advantage of the method according to the present disclosure is that in a case in which a corresponding vehicle is sold, a new owner can adapt the winding sectors being associated to the first sub-set or the second sub-set respectively according to his or her needs. Thus, the new owner can for example adapt the operational performance. If the new owner has an own subscription of performance, of course, this subscription can be used.

In an example, the winding sectors of the first sub-set of winding sectors are distributed over a circumference of the stator. This means that the winding sectors of the first sub-set of winding sectors are not concentrated in one place of the stator. This may be understood in at least one of a geometrical sense, an electrical sense, a magnetic sense, and a mechanic sense. This leads to a smooth operation of the electric machine. In this context, the winding sectors of the first sub-set of winding sectors may be evenly distributed over the circumference of the stator. This has the effect of an especially smooth operation of the electric machine. The distribution may be performed in a mechanically balanced manner, e.g., the stator is rotationally and/or dynamically balanced using the Lorentz force equilibrium principle.

In an example, deactivating a first sub-set of winding sectors comprises deactivating a pre-defined first sub-set of phase winding sectors. In other words, different first sub-sets may be pre-defined. Moreover, each of the pre-defined subsets may be associated with an operational mode of the electric machine. The operational mode may be a performance mode and the pre-defined sub-sets may relate to a low performance mode, a medium performance mode and/or a high performance mode. The operational mode may alternatively or additionally be an emission mode, e.g., relating to emissions measured using a $CO_2$ equivalent, and the pre-defined sub-sets may relate to a low emission mode, a medium emission mode or a high emission mode. Further alternatively or additionally, the operational mode may be a driving range mode and the pre-defined sub-sets may relate to a short range mode, a medium range mode and a long range mode. These pre-defined operational modes may be tested before being provided to users. Moreover, having a certain range of pre-defined options available facilitates the choice of an appropriate operational mode for the user.

In an example, the method may further comprise receiving a performance mode information and deactivating the pre-defined first sub-set of phase windings being associated with the performance mode information. Thus, the user may select a performance mode, e.g., high performance, medium performance, or low performance. The user can select the performance mode using an installation in the vehicle or using a personal electronic device such as a mobile phone, tablet, or computer. The performance mode information may be received by at least one of a cloud system or a control unit within the vehicle. Subsequently, the cloud system of the control unit may request the association of the winding sectors to the respective first sub-set or the second sub-set. This is a simple manner for providing different performance levels to a user of a vehicle having an electric drive system.

In an example, the method may further comprise triggering an operational mode of a cooling system being associated with the electric machine and being associated with the use of the winding sectors of the second sub-set. Thus, the electric machine is always cooled in an appropriate manner such that it can operate efficiently and reliably.

In another example, an operational mode of a sound generator and/or an operational mode of an interior lighting unit is triggered as a function of the use of the winding sectors of the second sub-set. Thus, for example for each performance mode a specific sound may be emitted and a specific lighting characteristic may be provided.

In an example, deactivating a first sub-set of winding sectors comprises deactivating at least all winding sectors of one of the p poles of one of the N phase windings. This means that entire poles may be deactivated and as a consequence thereof, the operational performance of the electric machine may be adapted. This is a simple and effective manner for adjusting the performance of the electric machine.

In another example, deactivating a first sub-set of winding sectors comprises deactivating at least all winding sectors of one of the N phase windings. This means that at least one entire phase is deactivated. Thus, the stator uses less phases than available, e.g., three or four phases instead of five. This is another simple and effective manner for adjusting the performance of the electric machine.

In a further example, at least one pole is formed by at least two winding sectors and deactivating a first sub-set of winding sectors comprises deactivating a portion of the at least two winding sectors. At least one, but not all, winding sectors of a pole are deactivated. This means that the number of poles and the number of phases remains unchanged. This is also simple and effective manner for adjusting the performance of the electric machine.

The method according to the present disclosure may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing device comprising means for carrying out the method according to the present disclosure. Using such a data processing device, an operational performance of an electric machine can be adjusted by adjusting the number and position of the winding sectors forming part of the first sub-set of winding sectors. Consequently, it is possible to use the same rotor and the same stator for providing electric machines of different operational performance, e.g., different maximum torque. This facilitates the manufacturing of the mechanical and electrical components of the electric machine.

The data processing device may also be called a control device for the electric machine.

According to a third aspect, there is provided a computer program comprising instructions which, when the program is executed by a computer, cause the computer to carry out the method according to the present disclosure. Thus, using the computer program, winding sectors of a stator of the electric machine may be associated with the first sub-set or the second sub-set. This leads to a situation in which the same rotor and the same stator of an electric machine can be used for providing electric machines of different operational performance, e.g., different maximum torque. The computer program may also be designated as a control software. Since the complexity of providing different levels of operational performance has been moved from the mechanical and electrical components of the electric machine to the control software thereof, or more generally speaking a computer program, it is easier to handle the corresponding complexity.

According to a fourth aspect, there is provided a computer-readable storage medium comprising instructions which, when executed by a computer, cause the computer to carry out the method according to the present disclosure. Also using the storage medium, winding sectors of a stator of the electric machine may be associated with the first sub-set or the second sub-set. This leads to a situation in which the same rotor and the same stator of an electric machine can be used for providing electric machines of different operational performance, e.g., different maximum torque. Since the complexity of providing different levels of operational performance has been moved from the mechanical and electrical components of the electric machine to the control software and a corresponding computer-readable storage medium, it is easier to handle the corresponding complexity.

According to a fifth aspect, there is provided an electric drive system comprising:
  an electric machine having a stator and a rotor, the stator comprising a set of N phase windings, wherein each of the N phase windings forms p poles around the circumference of the stator, each pole being formed by at least one winding sector,
  a switching unit being electrically connected to at least a first sub-set of winding sectors of the electric machine and comprising at least one switching means, wherein one switching means is electrically connected to each winding sector of the first sub-set of winding sectors such that each winding sector of the first sub-set of winding sectors can be selectively activated and deactivated using the corresponding switching means, and
  a data processing device according to the present disclosure, wherein the data processing device is communicatively connected to the switching unit such that the switching unit may be controlled using the data processing device.

In such an electric drive system, an operational performance, e.g., maximum torque, of the electric machine can be selectively adapted by selectively activating or deactivating the winding sectors of the first sub-set of winding sectors. Thus, the electric machine and the electric drive system may be used in applications having differing requirements with respect to the operational performance of the electric machine. This facilitates the manufacturing of the mechanical and electrical components of the electric machine and the electric drive system.

In an example, the electric drive system is an electric drive system for a vehicle, e.g., for a car. In this context, the same mechanical and electrical components of the electric machine, e.g., the same stator and the same rotor, may be used for a small city vehicle requiring only a comparatively low operational performance and for a luxury car requiring a comparatively high operational performance.

In an example, the electric drive system may further comprise an inverter unit for controlling the operation of the electric machine by selectively providing AC signals to the phase windings. The inverter unit may be electrically coupled to the phase windings of the electric machine and communicatively coupled to the data processing device such that the data processing device may trigger an AC drive signal for a second sub-set of winding sectors of the electric machine being provided by the inverter unit. Coupling the data processing device and the inverter unit has the effect that the AC drive signals being provided to the winding sectors of the second sub-set may be adjusted as a function of the number and position of the winding sectors of the first sub-set. This allows for smoothly and reliably operating the electric drive system.

In an example, each winding sector of the stator is a concentrated winding sector. In other words, the stator comprises concentrated windings.

In a further example, the rotor comprises a set of phase windings or permanent magnets. This means that the rotor can be designed with or without permanent magnets depending on the desired application.

In a further example, the electric machine is a synchronous reluctance motors, the rotor comprises no permanent magnets and the torque is generated by the principle of magnetic reluctance. This means that the rotor can be designed without permanent magnets depending on the desired application.

In a further example, the electric machine is a permanent magnet assisted synchronous reluctance motors, the rotor comprises low grade permanent magnets for assistance and the torque is generated by the principle of magnetic reluctance as well as flux linkage. This means that the rotor can be designed without rare earth intensive permanent magnets depending on the desired application.

In an example, the rotor is a squirrel cage rotor. This has the effect that the corresponding electric machine is able to self-start.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
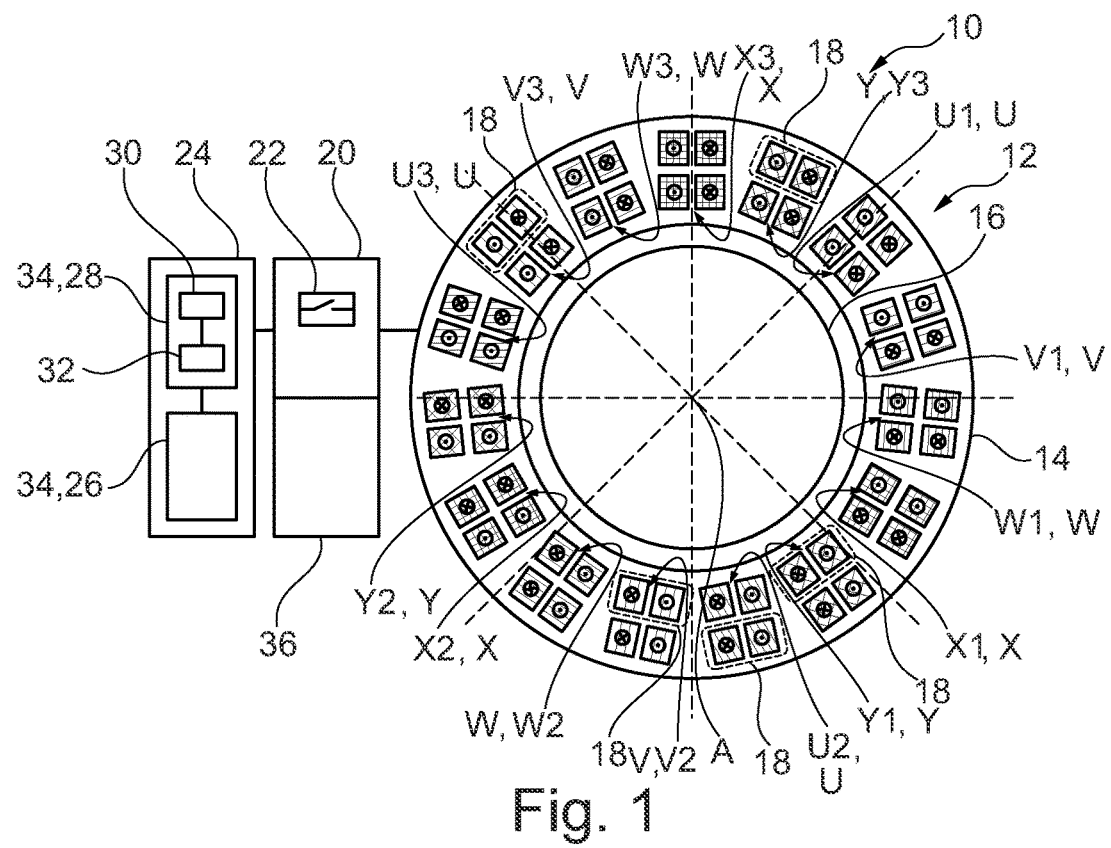
FIG. 1 shows an electric drive system according to the disclosure, comprising a data processing device according to the disclosure, a computer program according to the disclosure and a computer-readable storage medium according to the disclosure, wherein, using the data processing device, a method according to the disclosure may be carried out, and wherein the electric machine of the electric drive system is in a high performance mode.

FIG. 1 shows an electric drive system 10 for a vehicle.

The electric drive system 10 comprises an electric machine 12 having a stator 14 and a rotor 16. Both the stator 14 and the rotor 16 share a middle axis A. for the rotor 16 the middle axis A is an axis of rotation.

In the present example, the stator 14 comprises a set of five phase windings (N=5), which are designated by letters U, V, W, X, Y. Each of the phase windings forms three poles (p=3) around the circumference of the stator 14.

The poles of the phase winding U are designated U1, U2, U3. Accordingly, the poles of the phase winding V are designated V1, V2, V3 and the poles of the phase winding W are designated W1, W2, W3. The poles of the phase winding X are designated X1, X2, X3 and the poles of the phase winding Y are designated Y1, Y2, Y3.

Moreover, in the present example, each pole is formed by two winding sectors 18 which are generally designated by reference sign 18. For reasons of better visibility in the Figures, only some of the winding sectors 18 are equipped with a reference sign.

Each winding sector 18 is a concentrated winding sector. The portion of a winding sector 18 where the current direction comes out of the drawing plane are indicated with a point in a circle. The portions of a winding sector 18 where the current direction is oriented into the drawing plane are indicated with a cross in a circle. It is noted that these current directions are an example only.

Winding sectors 18 forming part of the same pole are arranged adjacent to one another along a radial direction of the stator 14. In other words, winding sectors 18 of the same pole are arranged one behind the other in a radial direction.

The electric drive system 10 also comprises a switching unit 20.

The switching unit 20 is electrically connected to at least a first sub-set of winding sectors 18. In the example shown in the Figures, the switching unit 20 is electrically connected to all of the winding sectors 18.

The switching unit 20 comprises one switching means 22 for each winding sector 18. Thus, the switching unit 20 comprises a total of 30 switching means 22.

For better visibility, only one switching means 22 is shown in FIG. 1 being representative of all the switching means 22.

Using the corresponding switching means 22, each winding sector 18 can be selectively activated and deactivated.

Being activated means that the switching means 22 provides an electrical connection between the respective winding sector 18 and an electric energy source, e.g., the switching means 22 is in a closed state. Being deactivated means that the switching means 22 disconnects an electrical connection to the electric energy source. In other words, the switching means 22 is in an open state.

The electric drive system 10 also comprises a data processing device 24.

The data processing device 24 comprises a data processing unit 26 and a data storage unit 28.

The data storage unit 28 comprises a computer-readable storage medium 30 comprising instructions which, when executed by the data processing unit 26 or more generally a computer, cause the data processing unit 26 to carry out a method for adjusting an operational performance of the electric machine 12 which will be explained in detail further below.

On the data storage unit 28 or more specifically on the computer-readable storage medium 30, there is provided a computer program 32 comprising instructions which, when the computer program is executed by the data processing unit 26 or more generally a computer, cause the data processing unit 26 to carry out the method for adjusting an operational performance of the electric machine 12 which will be explained in detail further below.

Altogether, the data processing unit 26 and the data storage unit 28 form means 34 for carrying out the method for adjusting an operational performance of the electric machine 12 as will be explained further below.

In this context, the data processing device 24 is communicatively connected to the switching unit 20 such that the switching unit 20 may be controlled using the data processing device 24. In more detail, the data processing device 24 is configured for selectively activating or deactivating each of the switching means 22.

Thus, the data processing device 24 may also be designated as a control unit of the switching device 20. The data processing device 24 may comprise a suitable microprocessor or field programmable gate array (FPGA).

Moreover, the electric drive system 10 comprises an inverter unit 36 for controlling the operation of the electric machine 12 by selectively providing AC signals to the phase windings U, V, W, X, Y.

To this end, the inverter unit 36 is electrically coupled to the phase windings U, V, W, X, Y.

In the example shown in the figures, the electrical coupling is done via the switching unit 20, e.g., the inverter unit 36 is electrically coupled to the phase windings U, V, W, X, Y via the switching unit 20.

Moreover, the inverter unit 36 is communicatively coupled to the data processing device 24, such that the data processing device 24 may trigger an AC drive signal for one or more of the winding sectors 18 being provided by the inverter unit 36.

The rotor 16 of the electric machine 12 is a squirrel cage rotor.

As has been mentioned before, in FIG. 1, the electric machine 12 is in a high performance mode, e.g., a high maximum torque mode. In this mode, the electric machine 12 is operated in a known manner using all winding sectors 18 of all phases U, V, W, X, Y.

However, it is also possible to adjust an operational performance, e.g., the maximum torque, of the electric machine 12. This will be explained in the following with reference to FIGS. 2 to 7. The indication of the current directions is not repeated in FIGS. 2 to 7. In this respect, reference is made to FIG. 1.

To this end, the method for adjusting an operational performance of the electric machine 12 is performed using the data processing device 24.

Figure 8:
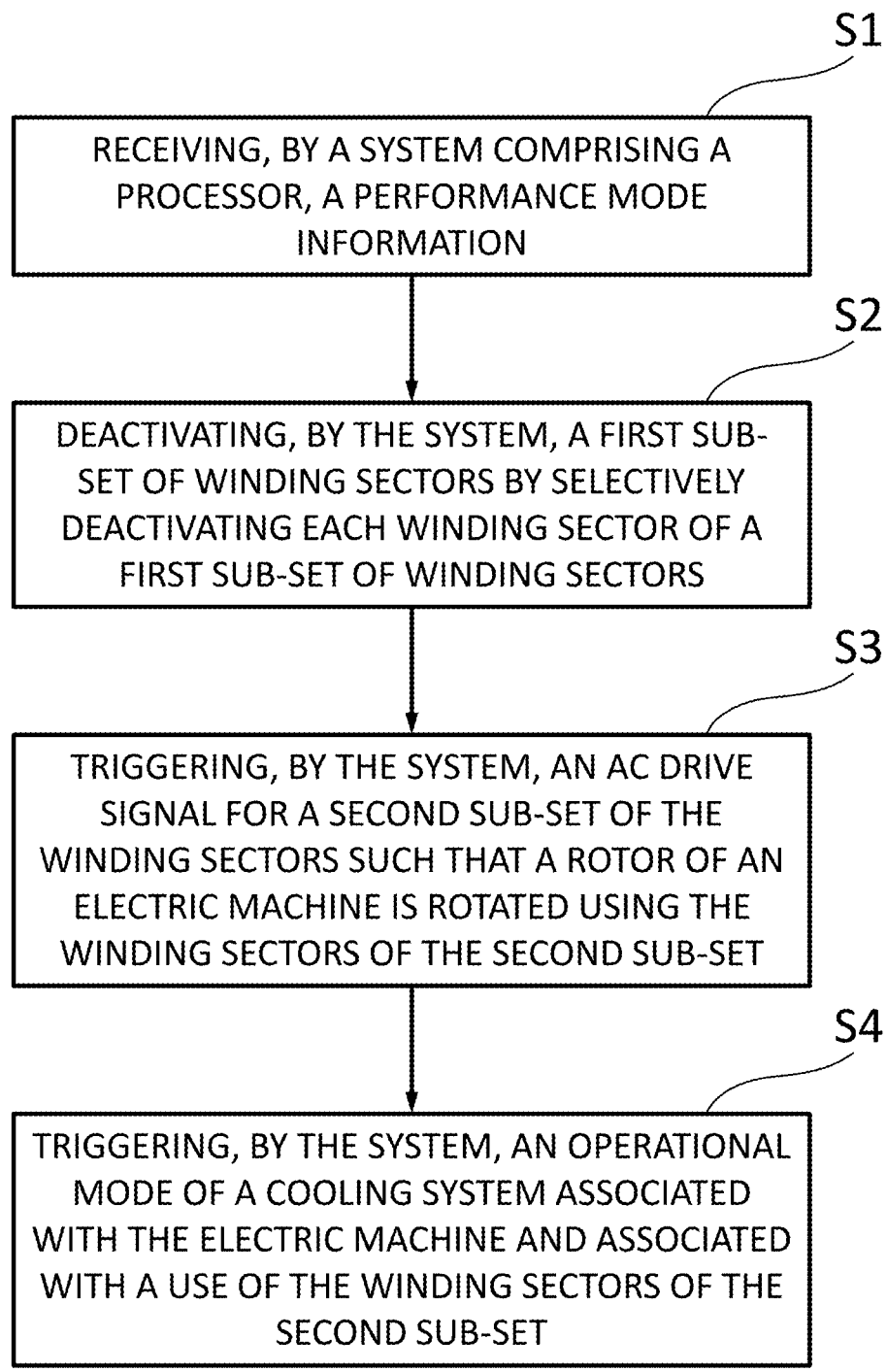
FIG. 8 shows steps of a method for adjusting operational performance of an electric machine.

In a first step S1 of the method (see FIG. 8), a performance mode information is received. In the present context, the performance information relates to an operational mode or a performance mode according to which the electric machine 12 shall be operated.

Each performance mode information is associated with an information relating to a first sub-set of winding sectors 18 which are to be deactivated by opening the corresponding switching means 22 and a second sub-set of winding sectors 18 which are to be activated by closing the corresponding switching means 22. For the activated winding sectors, an AC drive signal is triggered such that the rotor 16 is rotated using the winding sectors 18 of the second sub-set (step S3). In other words, only the winding sectors of the second sub-set are used for moving the rotor 16.

Figure 2:
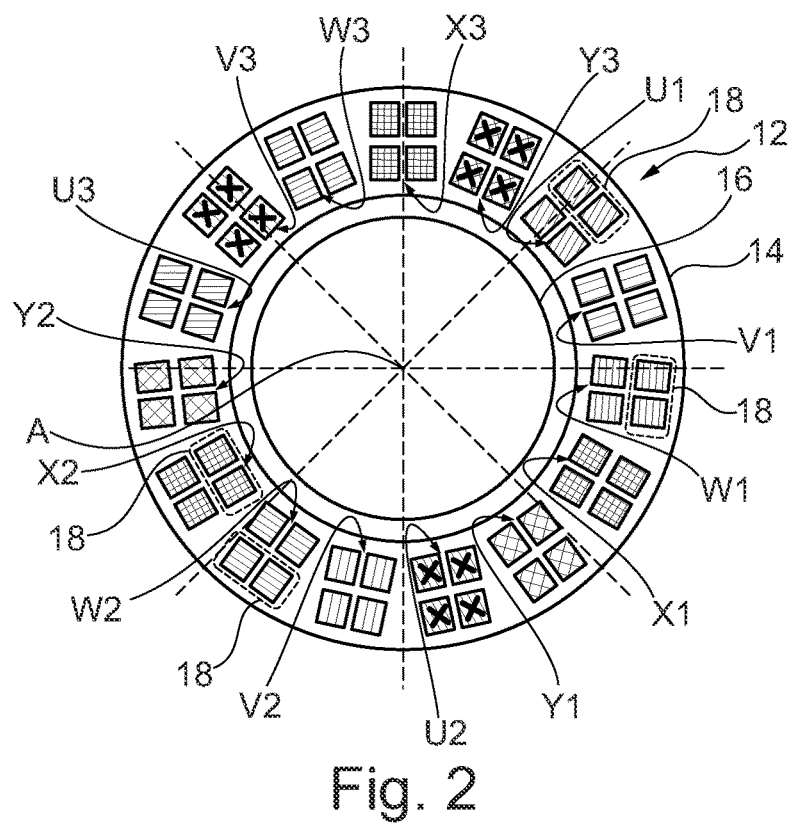
FIG. 2 shows the electric machine of the electric drive system of FIG. 1, wherein the electric machine is in a first alternative of a medium performance mode.
Figure 3:
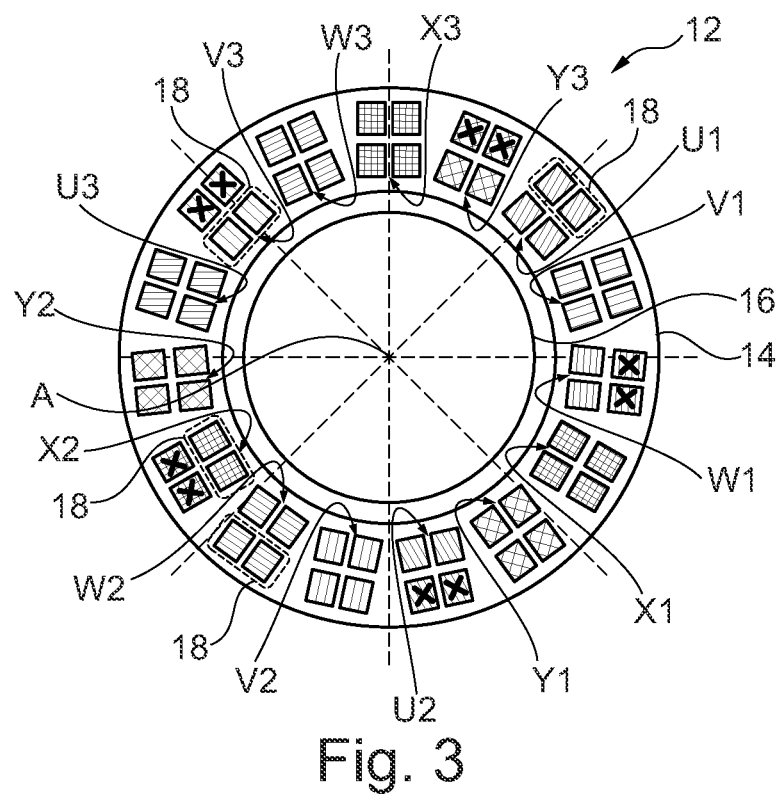
FIG. 3 shows the electric machine of the electric drive system of FIG. 1, wherein the electric machine is in a second alternative of a medium performance mode.
Figure 4:
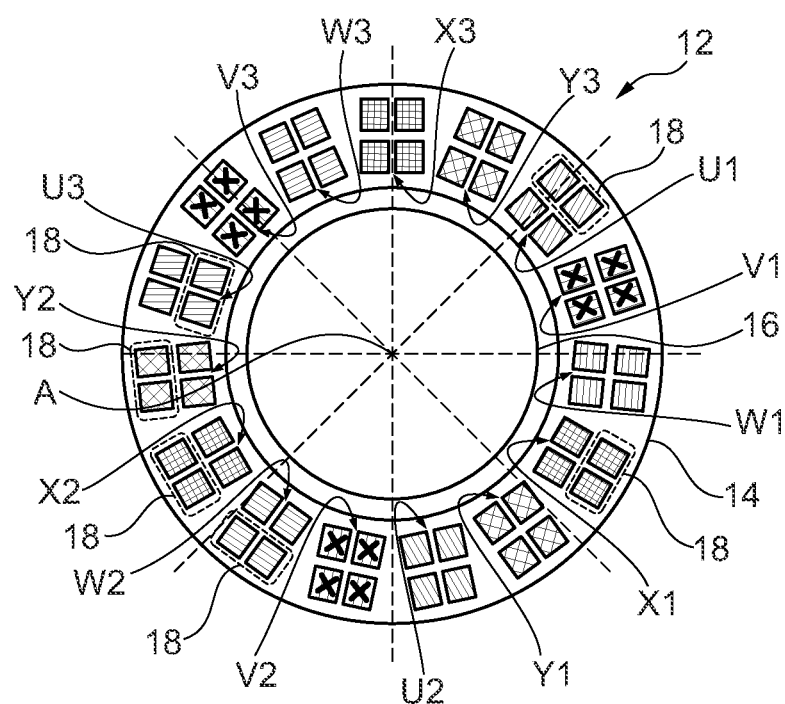
FIG. 4 shows the electric machine of the electric drive system of FIG. 1, wherein the electric machine is in a third alternative of a medium performance mode.

In this context, FIGS. 2 to 4 show three alternatives relating to a medium performance mode, e.g., the performance mode information is "medium performance".

In the alternative of FIG. 2, the winding sectors 18 being marked with a cross form the first sub-set of winding sectors 18. The remaining winding sectors 18 form the second sub-set.

As can be seen from the Figure, the winding sectors 18 of the first sub-set comprise all winding sectors of the poles U2, V3 and Y3. Thus, entire poles U2, V3, Y3 are deactivated (step S2).

Moreover, the winding sectors of the first sub-set are distributed over a circumference of the stator, e.g., the deactivated poles are not arranged adjacent to one another.

In the alternative of FIG. 3, again the winding sectors 18 being marked with a cross form the first sub-set of winding sectors 18. The remaining winding sectors 18 form the second sub-set.

As can be seen from the FIG. 3, respectively one winding sector 18 of poles W1, U2, X2, V3 and Y3 is deactivated (step S2). Again, the deactivated winding sectors are distributed over the circumference of the stator 14.

In contrast to the alternative of FIG. 2, only one out of the two winding sectors 18 per pole is deactivated, e.g., all phases U, V, W, X, Y, and all poles are operational.

A third alternative is shown in FIG. 4. In this alternative, all winding sectors of the phase V are deactivated (step S2). Consequently, only four out of five phases U, V, W, X, Y are operational.

Due to the fact that in all alternatives relating to the medium performance mode, less winding sectors 18 are used for rotating the rotor 16 the electric machine 12 can only provide a lower performance, e.g., lower maximum torque, as in the configuration of FIG. 1, where all winding sectors 18 are used.

Figure 5:
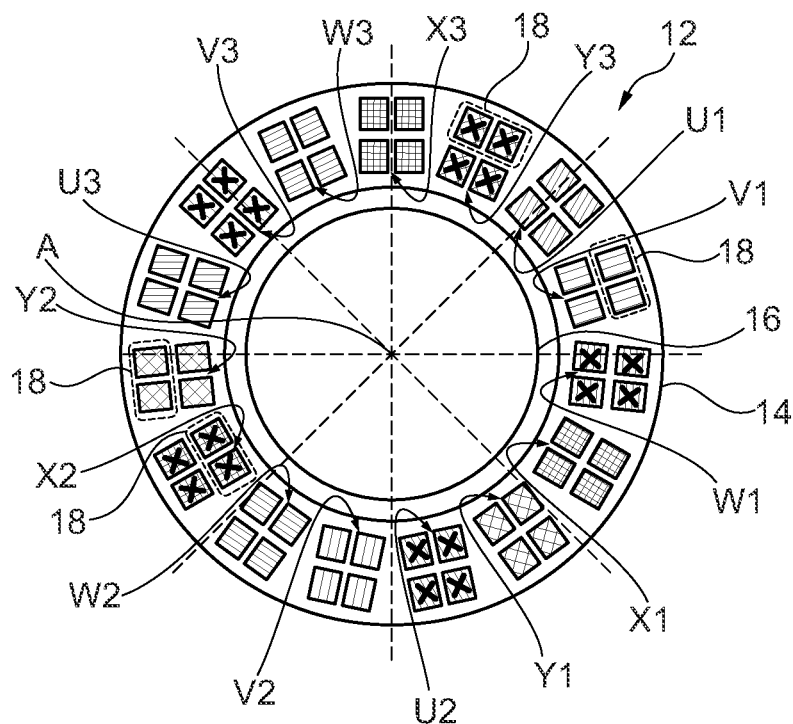
FIG. 5 shows the electric machine of the electric drive system of FIG. 1, wherein the electric machine is in a first alternative of a low performance mode.
Figure 6:
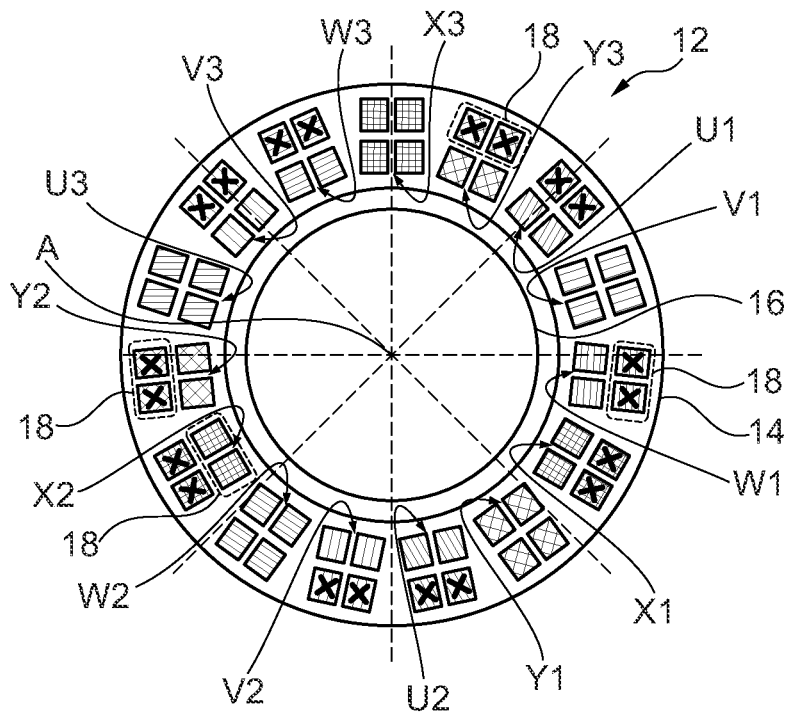
FIG. 6 shows the electric machine of the electric drive system of FIG. 1, wherein the electric machine is in a second alternative of a low performance mode.
Figure 7:
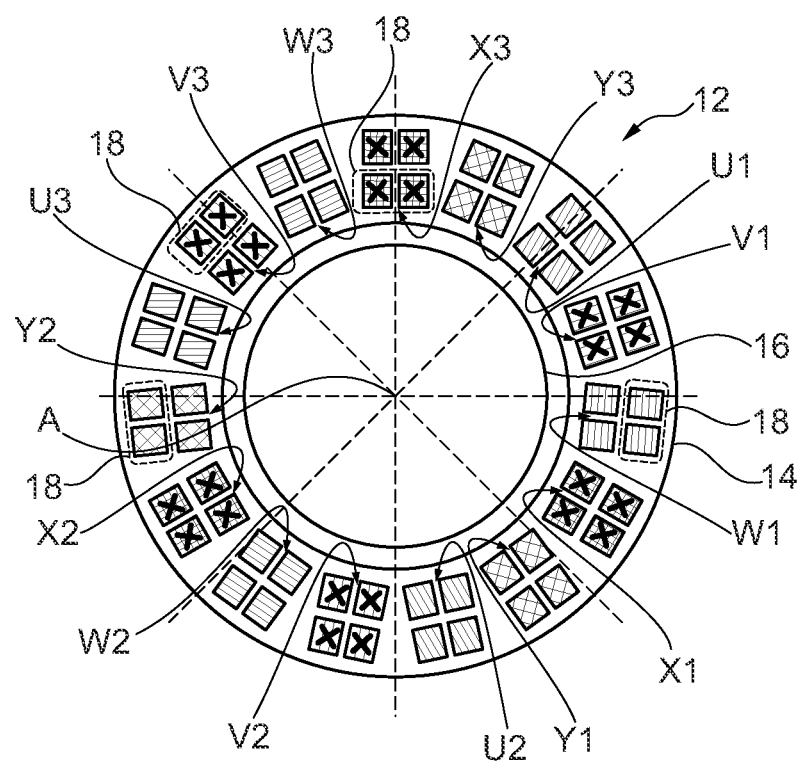
FIG. 7 shows the electric machine of the electric drive system of FIG. 1, wherein the electric machine is in a third alternative of a low performance mode.

In this context, FIGS. 5 to 7 show three alternatives relating to a low performance mode, e.g., the performance mode information is "low performance".

In the alternative of FIG. 5, the winding sectors 18 being marked with a cross form the first sub-set of winding sectors 18. The remaining winding sectors 18 form the second sub-set.

As can be seen from FIG. 5, the winding sectors 18 of the first sub-set comprise all winding sectors of the poles W1, U2, X2, V3 and Y3. Thus, entire poles W1, U2, X2, V3, Y3 are deactivated (step S2).

Moreover, the winding sectors 18 of the first sub-set are distributed over a circumference of the stator 14, e.g., the deactivated poles are not arranged adjacent to one another.

In the alternative of FIG. 6, again the winding sectors 18 being marked with a cross form the first sub-set of winding sectors 18. The remaining winding sectors 18 form the second sub-set.

As can be seen from the Figure, respectively one winding sector 18 of poles U1, W1, X1, U2, V2, X2, Y2, V3, W3, Y3 is deactivated (step S2). Again, the deactivated winding sectors 18 are distributed over the circumference of the stator 14.

In contrast to the alternative of FIG. 5, only one out of the two winding sectors per pole is deactivated, e.g., all phases U, V, W, X, Y, and all poles are operational.

A third alternative is shown in FIG. 7. In this alternative, all winding sectors 18 of the phase V and all winding sectors of the phase X are deactivated (step S2). Consequently, only three out of five phases are operational.

Due to the fact that in all alternatives relating to the low performance mode, less winding sectors 18 are used for rotating the rotor 16 as in the alternatives relating to the medium performance mode, the electric machine 12 can only provide a lower performance, e.g., lower maximum torque, as in the configuration of FIGS. 2 to 4.

It is noted that, depending on the specific application, also other winding sectors 18 than shown in the examples of FIGS. 2 to 7 may be deactivated.

Moreover, the number of deactivated winding sectors 18 may be adapted. Consequently, it is possible to create a very low performance mode by deactivating even more winding sectors 18 as in the examples of FIGS. 5 to 7. Such a performance mode may also be called an entry performance mode.

In all alternatives and operational modes as has been explained above, a corresponding operational mode of a cooling system of the electric drive system 10 is triggered (step S4). The cooling system is associated with the electric machine 12 such that it is able to keep components of the electric machine 12 within a desired temperature range. Moreover, the cooling system is associated with the use of the winding sectors 18 of the respective operational mode as has been explained above. Thus, the operation of the cooling system is adapted to the operational mode of the electric machine 12.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 electric drive system
12 electric machine
14 stator
16 rotor
18 winding sector
20 switching unit
22 switching means
24 data processing device
26 data processing unit
28 data storage unit
30 computer-readable storage medium
32 computer program
34 means
36 inverter unit
A middle axis
U phase winding
V phase winding
W phase winding
X phase winding
Y phase winding
U1 first pole of phase winding U
U2 second pole of phase winding U
U3 third pole of phase winding U
V1 first pole of phase winding V
V2 second pole of phase winding V
V3 third pole of phase winding V
W1 first pole of phase winding W
W2 second pole of phase winding W
W3 third pole of phase winding W
X1 first pole of phase winding X
X2 second pole of phase winding X
X3 third pole of phase winding X
Y1 first pole of phase winding Y
Y2 second pole of phase winding Y
Y3 third pole of phase winding Y

What is claimed is:

1. A method for adjusting operational performance of an electric machine, wherein the electric machine comprises a stator and a rotor, wherein the stator comprises a set of phase windings, wherein each phase winding of the set of phase windings forms a same defined quantity of poles around a circumference of the stator, and wherein each pole of the poles of the phase winding is formed by at least one winding sector of a group of winding sectors of the phase winding, the method comprising:
rotating, by a system comprising a processor, the rotor by:
selectively deactivating each winding sector of a first sub-set of the winding sectors of the set of phase windings, wherein the first sub-set of winding sectors comprises at least one winding sector of the set of phase windings; and
selectively activating, using AC drive signals, each winding sector of a second sub-set of the winding sectors of the set of phase windings, wherein the second sub-set of winding sectors comprises more than one winding sector of the set of phase windings.

2. The method of claim 1, wherein the first sub-set of winding sectors comprises more than one winding sector, and the winding sectors of the first sub-set of the winding sectors are distributed over the circumference of the stator.

3. The method of claim 1, wherein the first sub-set of the winding sectors comprises a pre-defined first sub-set of the winding sectors.

4. The method of claim 3, further comprising:
receiving, by the system, performance mode information specifying the pre-defined first sub-set of phase windings.

5. The method of claim 1, further comprising:
triggering, by the system, an operational mode of a cooling system associated with the electric machine and associated with a use of the winding sectors of the second sub-set.

6. The method of claim 1, wherein selectively deactivating each winding sector of the first sub-set of the winding sectors comprises deactivating at least all winding sectors of one of the poles of at least one phase winding of the set of phase windings.

7. The method of claim 1, wherein selectively deactivating each winding sector of the first sub-set of the winding sectors comprises deactivating all winding sectors of one phase winding of the set of phase windings.

8. The method of claim 1, wherein at least one p pole is formed by at least two winding sectors and selectively deactivating the first sub-set of the winding sectors comprises deactivating a portion of the at least two winding sectors.

9. A non-transitory computer-readable medium, comprising executable instructions that, when executed by a processor of an electric machine comprising a stator and a rotor, wherein the stator comprises a set of phase windings, wherein each phase winding of the set of phase windings forms a same defined quantity of poles around a circumference of the stator, and wherein each pole of the poles is formed by at least one winding sector of a group of winding sectors of the phase winding, facilitate performance of operations, comprising:
   rotating the rotor by:
      selectively deactivating each winding sector of a first sub-set of the winding sectors of the set of phase windings, wherein the first sub-set of the winding sectors comprises at least one winding sector of the set of phase windings; and
      selectively activating, using AC drive signals, each winding sector of a second sub-set of the winding sectors of the set of phase windings, wherein the second sub-set of winding sectors comprises more than one winding sector of the set of phase windings.

10. The non-transitory computer-readable medium of claim 9, wherein the first sub-set of winding sectors comprises more than one winding sector, and the winding sectors of the first sub-set of the winding sectors are distributed over the circumference of the stator.

11. The non-transitory computer-readable medium of claim 9, wherein the first sub-set of the winding sectors comprises a pre-defined first sub-set of the winding sectors.

12. The non-transitory computer-readable medium of claim 11, wherein the operations further comprise:
   receiving a performance mode information specifying the pre-defined first sub-set of phase windings.

13. The non-transitory computer-readable medium of claim 9, wherein the operations further comprise:
   triggering an operational mode of a cooling system associated with the electric machine and associated with a use of the winding sectors of the second sub-set.

14. The non-transitory computer-readable medium of claim 9, wherein selectively deactivating each winding sector of the first sub-set of the winding sectors comprises deactivating at least all winding sectors of at least one of the poles of one phase winding of the set of phase windings.

15. The non-transitory computer-readable medium of claim 9, wherein selectively deactivating each winding sector of the first sub-set of the winding sectors comprises deactivating at least all winding sectors of one phase winding of the set of phase windings.

16. The non-transitory computer-readable medium of claim 9, wherein at least one pole is formed by at least two winding sectors and selectively deactivating the first sub-set of the winding sectors comprises deactivating a portion of the at least two winding sectors.

17. An electric machine comprising:
   a rotor;
   a stator, wherein the stator comprises a set of phase windings, wherein each phase winding of the set of phase windings forms a same defined quantity of poles around a circumference of the stator, and wherein each pole of the poles of the phase winding is formed by at least one winding sector of a group of winding sectors of the phase winding;
   a memory configured to store computer executable instruction; and
   a processor configured to execute at least one of the computer executable instructions that:
      rotates the rotor by:
         selectively deactivating each winding sector of a first sub-set of the winding sectors of the set of phase windings, wherein the first sub-set of winding sectors comprises at least one winding sector of the set of phase windings; and
         selectively activating, using AC drive signals, each winding sector of a second sub-set of the winding sectors of the set of phase windings, wherein the second sub-set of winding sectors comprises more than one winding sector of the set of phase windings.

18. The electric machine of claim 17, wherein the first sub-set of winding sectors comprises more than one winding sector, and the winding sectors of the first sub-set of the winding sectors are distributed over the circumference of the stator.

19. The electric drive system of claim 17, wherein each winding sector of the stator comprises a concentrated winding sector.

20. The electric drive system of claim 17, wherein the rotor comprises a squirrel cage rotor.

* * * * *